United States Patent
Dishman et al.

(10) Patent No.: US 6,271,953 B1
(45) Date of Patent: *Aug. 7, 2001

(54) METHOD AND SYSTEM FOR OPTICAL FREE SPACE COMMUNICATIONS USING NON-MECHANICAL BEAM STEERING

(75) Inventors: John F. Dishman, Palm Bay; Edward R. Beadle, Melbourne, both of FL (US)

(73) Assignee: Harris Corporation, Melbourne, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/145,668

(22) Filed: Sep. 2, 1998

(51) Int. Cl.[7] .................................................. H04B 10/00
(52) U.S. Cl. .......................... 359/172; 359/130; 359/159; 359/193; 359/183
(58) Field of Search .................................... 359/130, 172, 359/159, 193, 183

(56) References Cited

U.S. PATENT DOCUMENTS

| | | |
|---|---|---|
| 3,493,759 | 2/1970 | Adler . |
| 3,689,841 | 9/1972 | Bello et al. . |
| 4,074,234 | 2/1978 | Fox . |
| 4,090,036 | 5/1978 | Stott et al. . |
| 4,575,186 | 3/1986 | Gottlieb et al. . |
| 4,579,421 | 4/1986 | Brown et al. . |
| 4,628,493 | 12/1986 | Nelson et al. . |
| 4,639,092 | 1/1987 | Gottlieb et al. . |
| 4,671,620 | 6/1987 | Yao . |
| 4,768,186 | 8/1988 | Bodell . |
| 4,867,560 | 9/1989 | Kunitsugu . |
| 4,960,322 | 10/1990 | Khoshnevisan et al. . |
| 4,982,445 | 1/1991 | Grant et al. . |
| 5,062,150 * | 10/1991 | Swanson et al. ..................... 359/152 |
| 5,119,225 * | 6/1992 | Grant et al. ........................... 359/172 |
| 5,142,400 * | 8/1992 | Solinsky ............................... 359/159 |
| 5,351,148 | 9/1994 | Maeda et al. . |
| 5,410,421 | 4/1995 | Huignard et al. . |
| 5,436,751 | 7/1995 | Ohya et al. . |
| 5,450,223 | 9/1995 | Wagner et al. . |
| 5,463,493 | 10/1995 | Shah . |
| 5,610,748 | 3/1997 | Sakanaka et al. . |
| 5,682,256 | 10/1997 | Motley et al. . |
| 5,689,354 | 11/1997 | Orino . |
| 5,710,652 * | 1/1998 | Bloom et al. ......................... 359/152 |
| 6,091,528 * | 7/2000 | Kanda ................................... 359/159 |
| 6,097,522 * | 8/2000 | Maerki et al. ....................... 359/159 |
| 6,137,612 * | 10/2000 | Startup ................................. 359/172 |
| 6,181,450 * | 1/2001 | Dishman et al. ..................... 359/124 |

OTHER PUBLICATIONS

P.J. Oleski, et al., "Non–Mechanical Laser Beam Steering/ Spoiling Methods For Intersatellite Cross Links," SPIE, vol. 2123, pp. 336–347.

* cited by examiner

Primary Examiner—Leslie Pascal
Assistant Examiner—Hanh Phan
(74) Attorney, Agent, or Firm—Allen, Dyer, Doppelt, Milbrath & Gilchrist, P.A.

(57) ABSTRACT

A method and system of communicating in free space comprises a first communication terminal having a multiplexer circuit for multiplexing a plurality of analog communication signals into a single broad band frequency division multiplexed signal. A laser generates an optical carrier signal, and an electro-optic modulator produces a phase modulated optical communications signal. A pointing and tracking beacon is also generated and transmitted with the optical communications signal to a receiver unit positioned at a second communications terminal, such as a second satellite. The receiver unit receives the phase modulated optical communications signal and pointing and tracking beacon and includes a cascaded Bragg cell and liquid crystal. A communications detector detects the optical communications signal and a pointing and tracking detector detects the pointing and tracking beacon. A controller is responsive to the communications detector and generates a control signal to the receive beam steering assembly to change the index of refraction through the cascaded Bragg cell and liquid crystal.

46 Claims, 9 Drawing Sheets

METHOD AND SYSTEM FOR OPTICAL FREE SPACE COMMUNICATIONS USING NON-MECHANICAL BEAM STEERING

FIELD OF THE INVENTION

This invention is related to the field of optical communications, and more particularly, this invention is related to a method and apparatus of free space satellite communications using an optical carrier signal and a pointing and tracking beacon signal for non-mechanical steering.

BACKGROUND OF THE INVENTION

U.S. patent application Ser. No. 09/076,494, filed May 12, 1998, and entitled, "SYSTEM AND METHOD FOR FREE SPACE OPTICAL COMMUNICATIONS," assigned to the present assignee by the same inventors, and hereby incorporated by reference in its entirety, describes a method by which next generation satellite communication systems could achieve extremely high data rates for direct intersatellite, satellite-to-ground, and ground-to-satellite communications over extremely large line-of-sight distances using optical technology. The application achieved a technological advance by circumventing various shortcomings, such as common with optical data communication technology that followed the development of terrestrial fiber optic networks and concentrated solely on the transmission of digital information, typically using a pulse-pulse modulation (PPM), on-off keying (OOK) format, or wavelength-division multiplexing (WDM) to increase the information rate in optical channels. Those techniques did not fully exploit the advantages of optical communication technology for high data rate space based applications.

The invention disclosed in the '494 application circumvented those shortcomings by electrically combining a number of data sources, digital or analog, using a frequency-division multiple access theme, and using this signal as a wide band modulating signal to alter the phase of a single optical carrier. The constant envelope of phase modulation was advantageous as compared to amplitude modulations (OOK), (PPM) for simplifying detection schemes as is well known in communications. At the receiving terminal, the carrier is coherently demodulated and the individual electrical signals recovered using filtering of amplification. The invention described in that application, unlike known prior art, allows digital and analog signals to simultaneously share a single optical carrier.

The invention of the '494 application allows both analog and digital data to be transmitted simultaneously on a phase modulated optical communication signal to a receiver, such as for intersatellite and satellite-to-ground communications. Because the optical carrier signal is phase modulated, the problems associated with moving targets and changes in distances between the targets, e.g., satellites and/or ground stations and satellites, are reduced. A constant envelope type of modulation, i.e., phase modulation, is used instead of the more conventional intensity modulation, which changes the amplitude of the signal. As a result, no auxiliary or pilot signal is necessary. Additionally, the phase modulated signal is readily adapted for non-mechanical steering, which decreases any payload weight for communications equipment, requires less fuel and decreases acquisition times, and increases reliability.

Typically, a mixture of analog, digital or RF signals are each passed through a mixer where respective signals are up converted into a unique signal slot or channel. The frequencies then are combined to form the broad band frequency division multiplexed signal. A laser generates an optical carrier signal. An electro-optic modulator phase modulates the optical carrier signal with the multiplexed signal to produce a phase modulated optical communication signal.

A receiver is positioned, such as in a satellite, to receive the phase modulated optical communications signal. The receiver comprises a demodulator for demodulating the phase modulated optical communications signal back into the original broad band frequency division multiplexed signal. A demultiplexer (e.g., filter) allows demultiplexing of the broad band frequency division multiplexed signal into the plurality of communication signals comprising the frequency division multiplexed signal.

A plurality of digital communication signals are generated and analog modulated onto an optical carrier using an electro-optic technique. The electro-optic modulator can preferably comprise a Mach-Zender electro-optic modulator. An antenna can receive communication signals to be multiplexed with a receiver, such as in a satellite, and can be connected through the frequency division multiplexer for receiving analog communication signals generated by a remote source. The electro-optic modulator preferably generates an optical carrier signal wavelength of about 1,550 nm. This wavelength is preferable because erbium-doped fiber amplifiers can be used at this wavelength for amplifying the phase modulated optical communication signals.

In many similar communication systems, a separate pointing and tracking (PAT) signal is used as a "beacon," for determining the amount of mechanical, coarse steering in gimbaled telescopes and fine steering in fine steering mirrors. However, relative to optical steering systems, these types of mechanical steering systems increase the payload weight, which requires more fuel, and increases acquisition times.

SUMMARY OF THE INVENTION

It is therefore an object of the present invention to provide a non-mechanical beam steering mechanism that allows efficient steering for optical free space communications with adequate beam steering control.

In accordance with the present invention, a method of communicating in free space now allows nonmechanical steering using a cascaded nematic liquid crystal and an acousto-optic Bragg cell. In one aspect of the present invention, the method comprises the steps of frequency division multiplexing a plurality of communication signals into a single broad band frequency division multiplexed signal. An optical carrier signal is generated with a laser. This optical carrier signal is phase modulated with the broad band frequency division multiplexed signal by mixing the multiplexed signal with the optical carrier signal in an electro-optic modulator. A pointing and tracking beacon is also generated.

The phase modulated optical communication signal and pointing and tracking beacon is then transmitted from a first communications terminal to a receiver unit of a second communications terminal. This phase modulated optical communications signal and pointing and tracking beacon is received within a cascaded Bragg cell and liquid crystal at the second communications terminal. The index of refraction through the receive Bragg cell and receive liquid crystal display is changed based on the detected pointing and tracking beacon. This operation continually updates the optical line-of-sight paths to maintain the communication channel. The phase modulated optical communications signal is then demodulated back into the broad band frequency division multiplexed signal and then demultiplexed into a plurality of analog communication signals.

A system for communicating in free space is also disclosed and includes a first communication terminal, having a multiplexer circuit for multiplexing a plurality of analog communication signals into a single broad band frequency division multiplexed signal. A laser generates an optical carrier signal and an electro-optic modulator receives the broad band frequency division multiplexed signal and the laser generated optical carrier signal to produce a phase modulated optical communications signal. A pointing and tracking beacon is also generated. These signals are passed through a transmit beam steering assembly that nonmechanically steers the optical communications signal and pointing and tracking beacon by the means of a cascaded Bragg cell and liquid crystal.

A receiver is positioned at a second communications terminal, such as on a second satellite or even ground station, and receives the transmitted phase modulated optical communications signal and pointing and tracking beacon. This receiver includes a receive beam steering assembly, which includes a cascaded Bragg cell and liquid crystal that provides coarse and fine indexing of the received signal. Indexing is then changed based on the detected pointing and tracking beacon. A demodulator demodulates the phase modulated optical communications signal back into the broad band frequency division multiplexed signal. A demultiplexer demultiplexes the broad band frequency division multiplexed signal into the plurality of analog communication signals. A communications terminal and beam steering device is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The system used with the present invention is advantageous because it provides a method and system of communicating in free space with an optical carrier signal centered in about 1,550 nm, which is a phase modulated carrier and is advantageous over intensity modulation. With the constant envelope type of phase modulation, no auxiliary or pilot signal generator or detector is required. Additionally, the distances that often change between ground stations and satellites and/or two satellites in space would not affect the modulated communication signal as compared to an intensity modulated communication signal where the distance changes could create inconsistencies in data transmittal because of attenuation. Although some prior art systems disclose frequency modulated optical communication systems, most of these prior art systems are directed to the use of optical carrier signals transmitted through fiber. The present invention also uses a non-mechanical steering device that is advantageous because fewer moving parts are required, which allows faster reaction rates and higher reliability.

The present invention is also advantageous because it now allows for non-mechanical steering using a pointing and tracking (PAT) signal or "beacon," typically centered in a different wavelength (typically about 830 nm) that is sent along the same line-of-sight path as the transmitted communication signal. This beacon allows pointing and tracking. Although some overall details are given about how the PAT signals are detected and generated, the following detailed description explains primarily the use of liquid crystals and acousto-optic (AO) Bragg cells to remove mechanical components from the steering mechanism. In this description, the communication signal after modulation to "lightband" will often be in the shown in the drawings as $\lambda_{comm}$, and the generated beacon or pointing and control signal shown as $\lambda_{PAT}$. The subscripts R and T will also be added to distinguish between transmit and receive signals.

The non-mechanical steering device can be indexed to provide for open loop control on the transmit side of a communications terminal and closed loop control on the receive side of a communications terminal. It is also plausible for the receive terminal to transmit a beacon to aid pointing of the transmit signals. This enables double-ended tracking as is known in the art. For purposes of description and clarity, the description begins with the overall system of communicating in free space. Further details of the respective transmit and receive beam steering assemblies are described with reference to FIGS. 3–7.

Figure 1A:
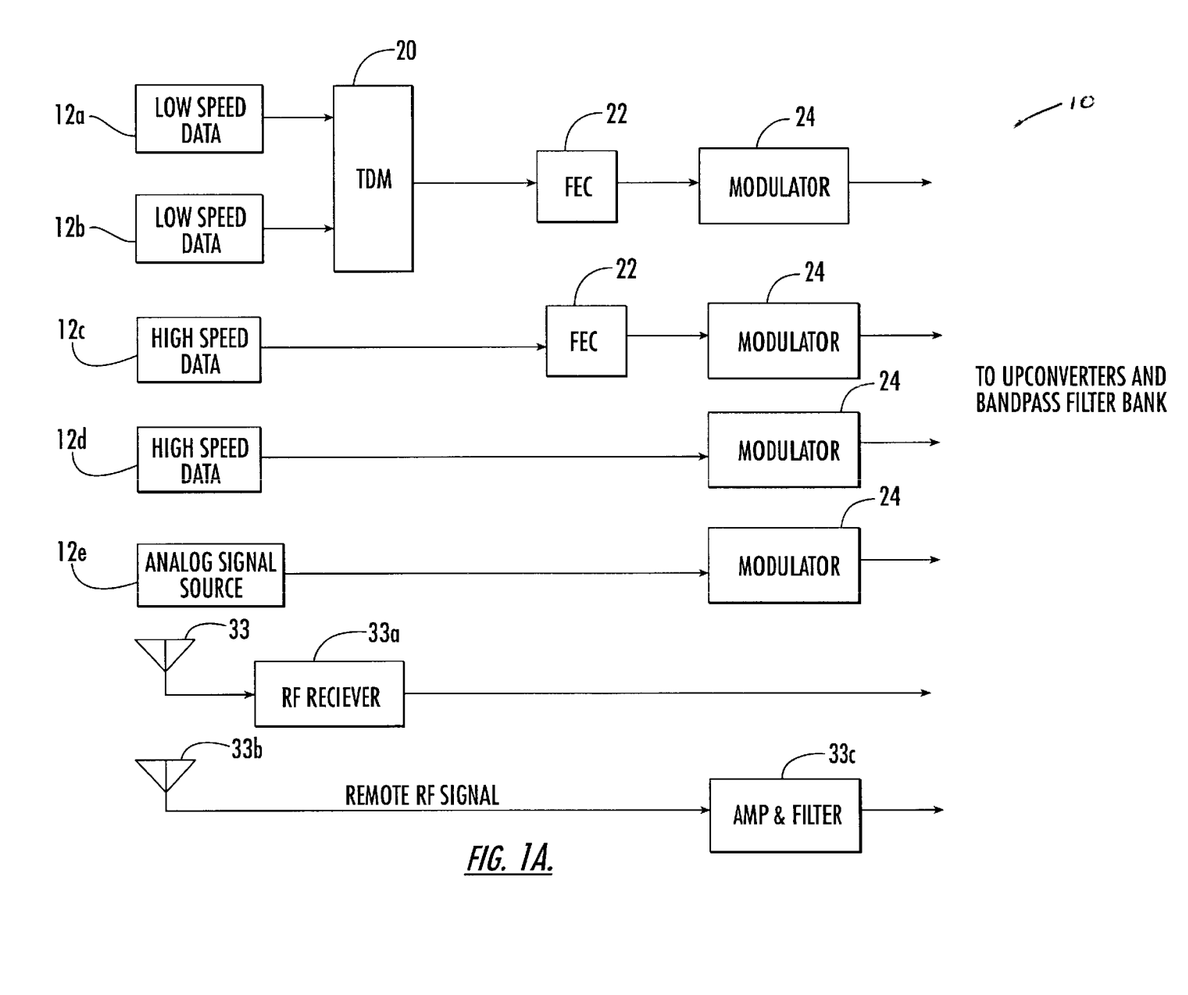
FIG. 1A is a schematic block diagram of the first half of the system of the present invention and showing band limited signal sources that are later combined.
Figure 1B:
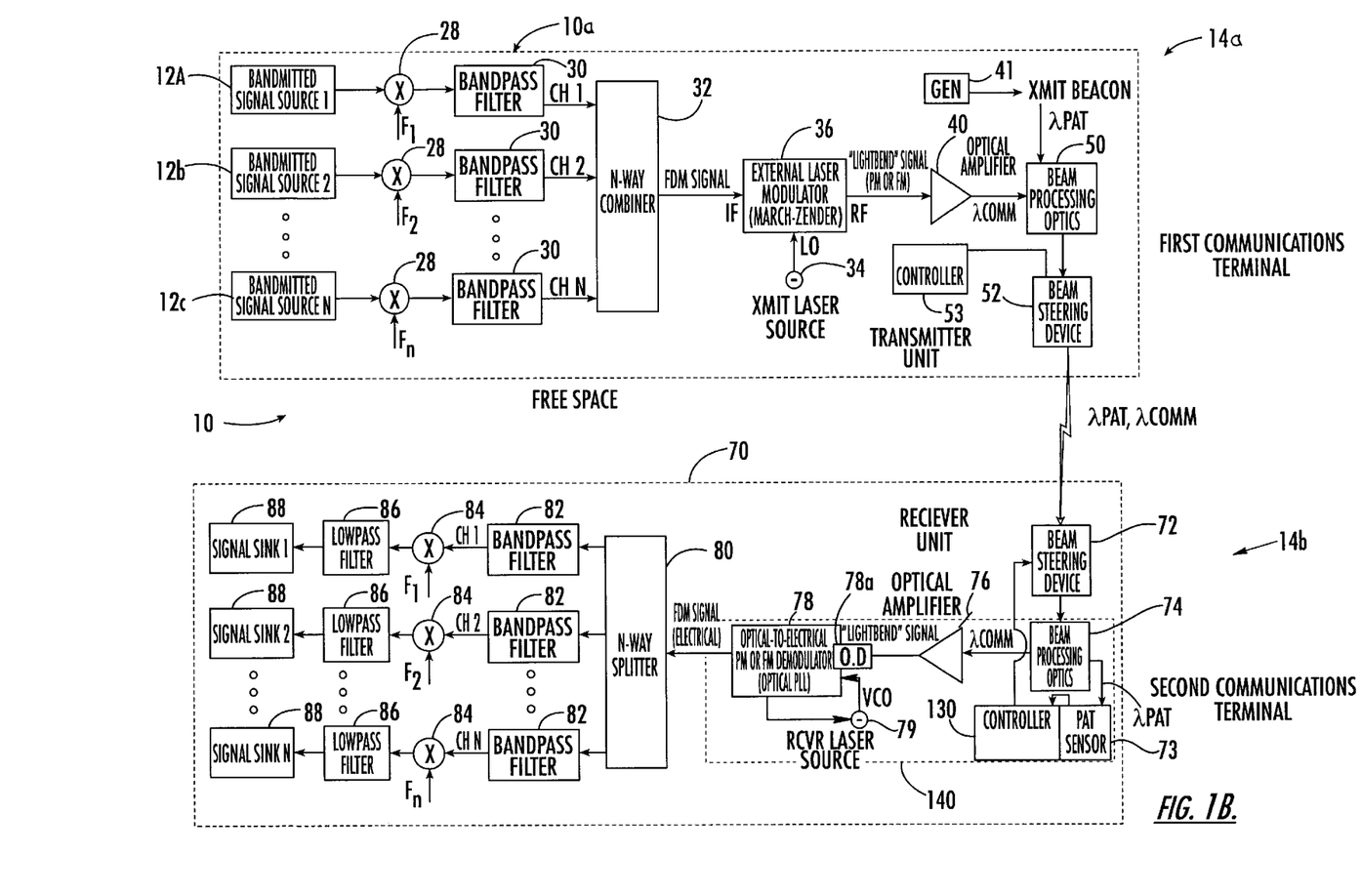
FIG. 1B is a schematic block diagram of a system of the present invention for a simpler configuration of one-way communication, and showing the frequency division multiplexer and laser that generates an optical carrier signal and a beam steering device, together with a detector array at the receiver.

Referring now to FIGS. 1A and 1B, there is illustrated at 10 the system which processes both digital and analog communication signals within a frequency division multiplexer and modulation unit indicated by the dotted line configuration at 10a. Thus, the present invention is advantageous because it allows both analog and digital communication signals to be transmitted along the same optical carrier through free space, such as in intersatellite communications.

For purposes of illustration, various examples of band limited signal sources are illustrated. Four digital data sources, an analog signal source, an RF receiver that receives analog signals and a remote amplifier and filter that receives other analog signals.

Figure 1C:
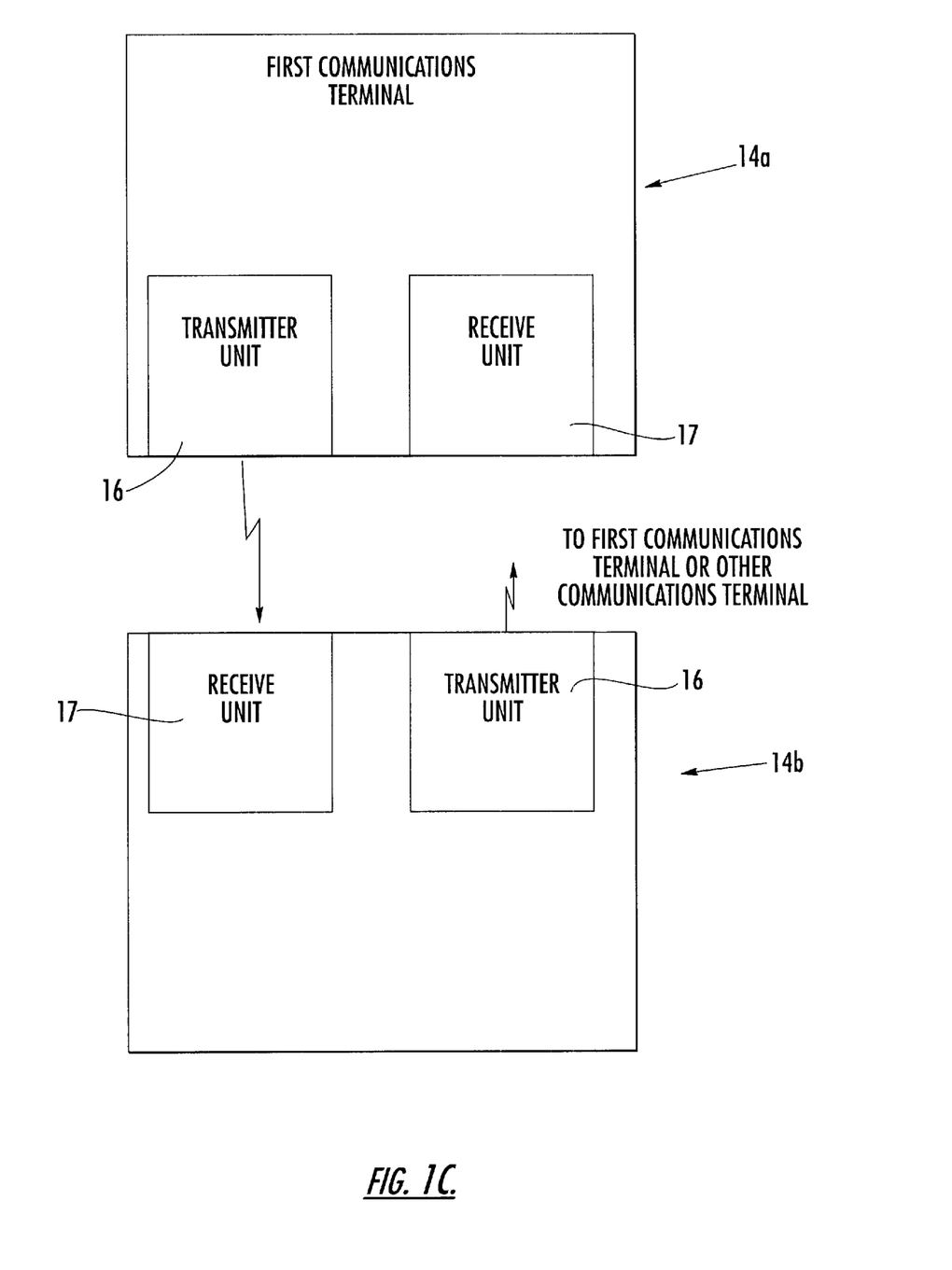
FIG. 1C is a high level block diagram of first and second communications terminal, showing how each could include a transmitter unit and receiver unit.

The sources of digital communication data 12a–d form an overall source or means for generating a plurality of digital communication signals. The description with respect to FIGS. 1A, 1B and 1C refers to a first communications terminal and second communications terminal 14a, 14b, each having respective transmitter units 16 for generating the optical communication signal and a PAT beacon, and receiver units 17 for receiving the optical communication signal and PAT beacon.

The communication terminals 14a, 14b could be two satellites or a ground station and satellite, each forming different communication platforms. As illustrated, two of the data sources 12a and 12b are low speed data sources and communicate to a time division multiplexer 20 that receives the plurality of digital communication signals and multiplexes the digital communication signals into a plurality of time division multiplexed data streams. In the illustrated example, the two sources 12a and 12b can include many other sources (not illustrated) that are time division multiplexed. The digital data signals that are multiplexed are illustrated as low speed digital data channels (LSDC) and combined into moderate data rate time division multiplexed data streams.

For purposes of illustration, the process of frequency division multiplexing will be described relative to the low speed data sources 12a and 12b. The time division multiplexed data streams are then independently encoded using forward error correction (FEC) 22 and then pass through respective digital modulators 24 to produce a wave form of an analog signal as known to those skilled in the art. The modulated signals then enter the frequency division multiplexer (FIG. 1B), which includes respective mixers 28 that up converts each analog communication signal into a respective frequency slot or channel (shown as channels 1, 2 . . . N) at a typically higher frequency. This is accomplished through respective coding input to the mixers as illustrated by coding input lines indicated at $F_1$ through $F_m$. Those up converted frequencies then pass through a bank of band pass filters 30, and then into an N-way combiner 32 where the signals are combined into the frequency division multiplexed signal.

Depending on one skilled in the art, modulation choices can be selected depending on the design preferences. It is possible to have different codings, including concatenated codes and interweaving. A convolution code and a standard Reed-Solomon code could also be used adequately in the present invention for FEC. Any higher speed base band digital data channels (HSDC), such as from sources 12c and 12d, do not pass into the time division multiplexer because of impacts on spacecraft prime power and hardware overhead. Thus, these signals pass through the forward error correction 22 and are digitally modulated by modulators 24.

Analog signal source 12c passes through modulator 24, but not forward error correction. Other analog wave forms, such as received on an uplink, but not demodulated on-board, or other frequencies are multiplexed without passing through any forward error correction and modulators. These signals can be received in an antenna 33 of an RF receiver 33a, or pass into an antenna 33b and pass as a remote RF signal to an amplifier and filter 33c. All communication signals are subject to multiplexing as described before to produce a broad band frequency division multiplexed signal. The steps of multiplexing includes up converting each signal to a desired, unique frequency, then band pass filtering those up converted frequencies and combining the total up converted frequencies into a broad band frequency division multiplexed signal. The frequency division multiplexer can be made flexible by introducing dynamic channel and bandwidth allocations so that a laser producing the optical carrier signal will have a bandwidth that can be allocated "on-demand" by programming local oscillators and filters (not shown).

FIG. 1B shows for simplicity a simple configuration (one-way communication). For duplex communication (two-way), each terminal transmits a communication signal and PAT beacon and receives the sending terminal signals. As shown in FIG. 1B, a transmit laser 34 generates an optical carrier signal. An electro-optic modulator 36 receives the broad band frequency division multiplexed signal and the laser generated optical carrier signal and phase modulates the optical carrier signal with the multiplexed signal to produce a phase modulated optical communication signal, shown on the drawings after amplification as $\lambda_{comm}$. As known to those skilled in the art in phase modulation, the instantaneous phase of the optical carrier signal is shifted in accordance with the modulating signal. In phase modulation, the extent of the phase shift is directly proportional to the amplitude of the modulating signal. The rapidity of the phase shift is directly proportional to both the amplitude and the frequency of the modulating signal, thus distinguishing phase modulation from frequency modulation where the result is a difference in the frequency-response characteristics.

The electro-optic modulator 36 preferably can comprise a Mach-Zender electro-optic modulator. This final up-conversion to "light band" as described is performed using the external analog modulation and power amplification techniques similarly used with continuous wave outputs of microwave transmissions. External modulation of the laser allows much wider modulation bandwidths than with direct laser diode modulation. Further, external modulation allows the laser diode to be selected without regard to the required modulation bandwidth using a Mach-Zender modulator and allow a very wide bandwidth (20 GHz). The laser requires low power and the Mach-Zender modulator can also implement frequency modulation besides the desired phase modulation.

After phase modulation, the phase modulated optical communication signal can pass through a sideband filter and then into erbium-doped fiber amplifier 40. The desired optical carrier signal produced by the laser 34 is centered about 1,550 nm to allow amplification of the phase modulated optical communication signal with erbium-doped fiber amplifiers. Typically for duplex systems, transmit and receive communication wavelengths would be chosen close to 1,550 nm, but spaced apart by about 5 nm. As illustrated, a transmit pointing and tracking signal or "beacon" (Xmit beacon) $\lambda_{PAT}$ is also generated through signal generator 41. As described below, transmit and receive beacons are centered in the 830 nm band, which is preferable (but not necessary) because the 830 nm lasers can be powerful and for pointing and tracking the lasers can have less wave front quality than the 1,550 nm signals. The large frequency separation is useful, but not necessary, for filtering the beacon from the communication signals.

Figure 2:
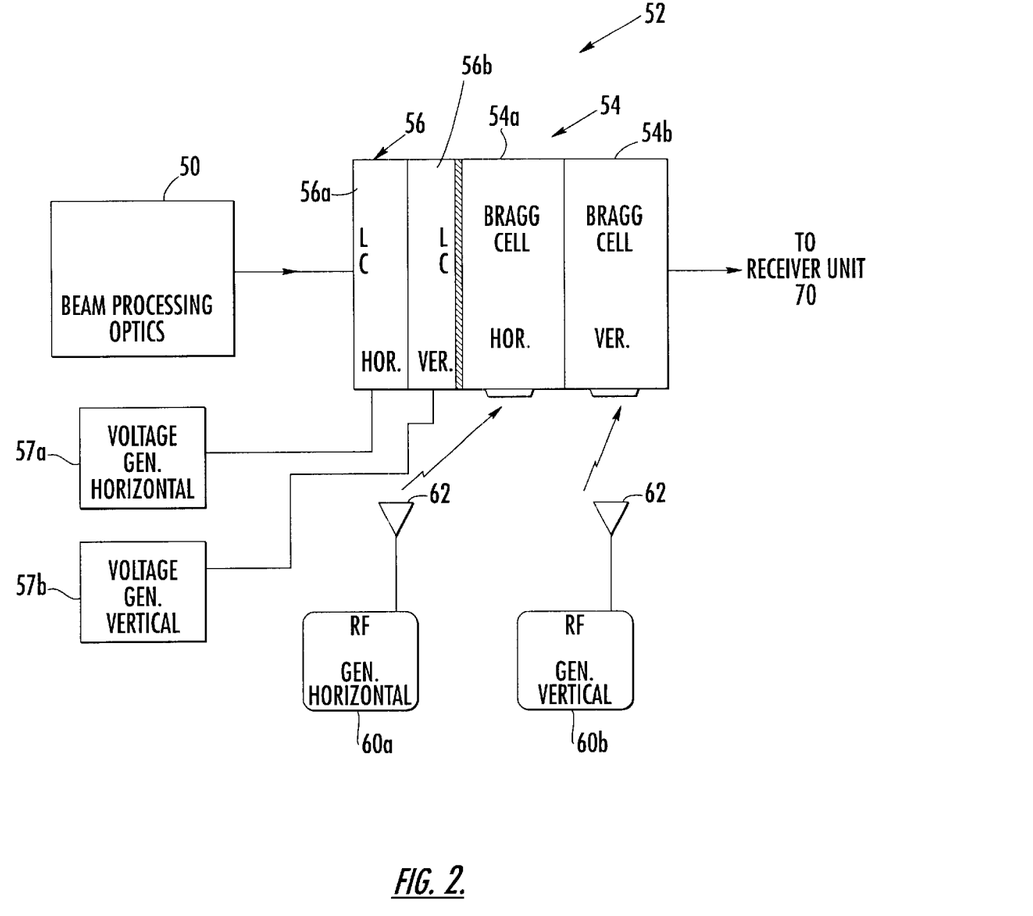
FIG. 2 is a schematic block diagram of a nonmechanical steering device having cascaded nematic liquid crystals and acousto-optic Bragg cells, and preferably first and second liquid crystals and first and second acousto-optic Bragg cell elements.

The amplified optical communication signal then passes into beam processing optics 50, together with the PAT beacon and through a transmit beam steering device or assembly 52 of the present invention. As illustrated in FIG. 2, the beam steering device 52 includes an acousto-optic Bragg cell 54 formed from first and second acousto-optic (AO) Bragg cell elements 54a, 54b that provide for respective vertical and horizontal, i.e., two-dimensional, "coarse" steering or indexing and a nematic liquid crystal 56, having first and second liquid crystal elements 56a, 56b which allow for fine indexing or steering of the phase modulated optical communication signal. There could be some optical processing between the LC and Bragg cell, although the schematic illustration of FIG. 2 does not show any optical processing.

The first and second Bragg cell elements 54a, 54b are connected to respective radio frequency sources, e.g., typically radio frequency generators (RF generators) 60a, 60b, which are highly stable, spectrally pure, local oscillators that are used for steering by changing the index of refraction and "steering" the optical communication signal from a ground station or via the satellite. Details of liquid crystals (LC) and Bragg cells are set forth in greater detail in an article entitled, "Non-Mechanical Laser Beam Steering/Spoiling Methods for Inter Satellite Cross Links," by Paul J. Oleski, Kevin W. Dorrion and Tim E. Busch, SPIE, Vol. 2123, the disclosure which is hereby incorporated by reference in its entirety.

The liquid crystal 56 includes first and second liquid crystals 56a and 56b that provide respective vertical and horizontal indexing. Voltage generators 57a, 57b provide the voltage control signal necessary for changing the index of refraction through the respective liquid crystal to allow steering. A controller 53 could be located at the transmitter unit of the illustrated first communications terminal 14a. Naturally, a similar controller could be located at the second communications terminal 14b, which could be another satellite or ground station terminal.

The controller 53 can generate a transmit beam control signal to the voltage generators 57a, 57b and RF generators 60a, 60b, which generate respective voltage control signals and radio frequency control signals to the transmit Bragg cell and transmit liquid crystals that are indicative of the location of the first communication terminal and the anticipated location of the second communication terminal when the phase modulated communications signal reaches the second communications terminal. The transmit beam control signal then controls the generation of the appropriate radio frequencies and voltage signals from the voltage generators and RF sources as shown in FIG. 2 to change the index of refraction through the Bragg cell and liquid crystal. Information in the controller concerning these locations could be determined "on-board" or from a ground station computer. Also, the RF signal that drives the Bragg cell could come from a remote terminal or someplace on the satellite. Thus, it could be remotely controlled.

As illustrated in FIG. 1B, a receiver unit 70 is positioned in the second communications terminal 14b, such as a satellite, to receive the phase modulated optical communication signal and PAT beacon. The receiver unit 70 corresponds to the receiver unit 17 of FIG. 1C, and includes a receive beam steering device or assembly 72 having a Bragg cell and liquid crystal structure similar as in beam steering device 52, as will be explained in greater detail below. Beam steering device 72 receives the signal and then passes the signal to beam processing optics 74 and optical amplifier 76. As will be explained in greater detail below, the PAT beacon is split off and detected in PAT sensor or detector 73, a controller 130, responsive to detector 73, generates control signals to the liquid crystals and Bragg cells adjust them for beam steering. The communication signal $\lambda_{comm}$ passes to an optical communications detector 78a for a communications portion, and an optical-to-electrical PM or FM demodulator 78 (i.e., optical phase locked loop demodulator) that receives VCO from receiver laser source 79. The signal passes to N-way splitter 80. The individual channels from the N-way splitter that correspond to each signal pass through band pass filters 82 and respective mixers 84 that are subject to coded sequences $F_1$ through $F_M$. The individual signals after demixing pass through low pass filter 86 and form the signal sinks 1-N 88 as illustrated. Because phase locked loop detection can be used, the Doppler shift induced by the relative motion of two communication platforms, such as in intersatellite communication systems, can be compensated.

After phase locked loop demodulation, as described above, the broad band frequency division multiplexed signal passes through the N-way splitter 80 where the various channels are separated in the basic reverse sequences of steps as described in the modulating and frequency multiplexing steps. The individual receiver would also maintain the bit and frame synchronization for proper decoding of the data streams. Naturally, appropriate circuitry can act as a digital demodulator for producing original digital data streams.

Figure 3:
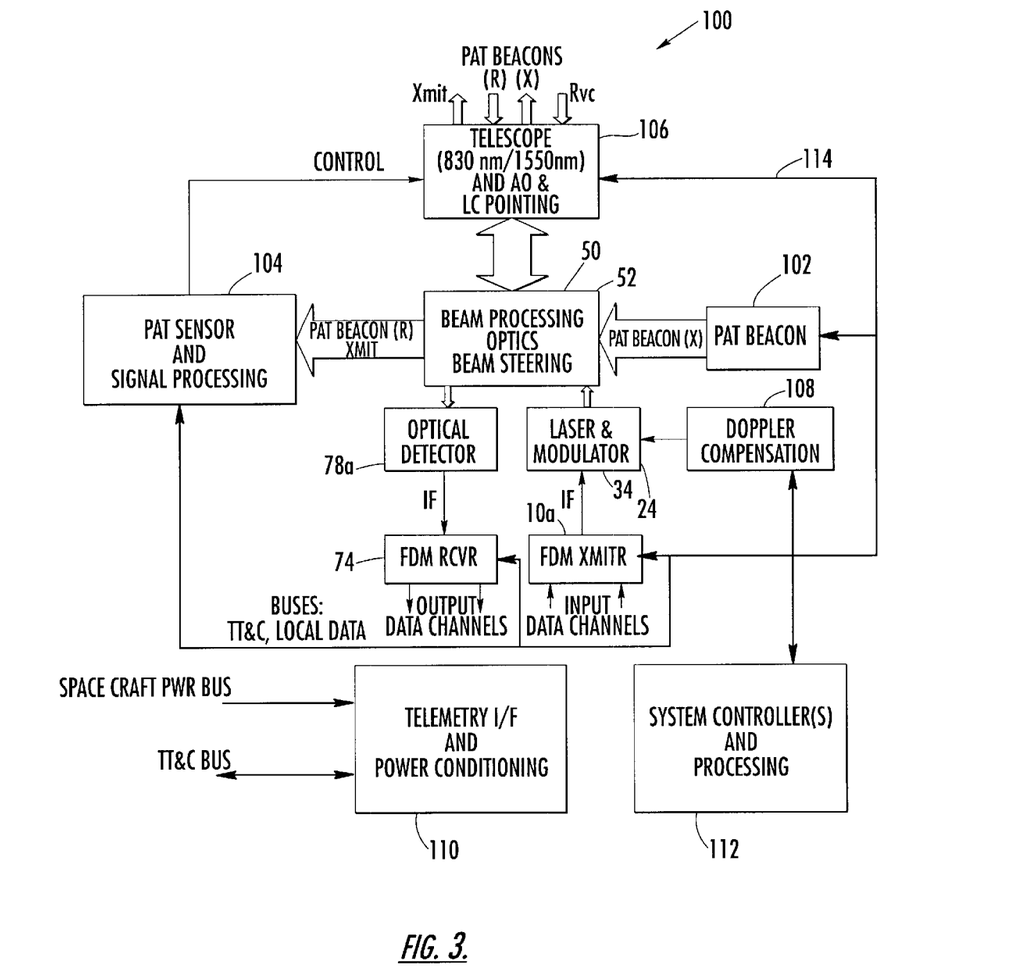
FIG. 3 is an overall schematic block diagram of functional elements used in a communications terminal, showing both transmit and receive elements and pointing and tracking (PAT) sensor (detector).

FIG. 3 illustrates a high level block diagram of a laser communications terminal indicated at 100, which can be used such as in a satellite. As noted, the optical carriers are generated by the laser for transmit and receive laser beams in the 1,550 nm band and offset by several nm to ease optical filtering. Pointing and tracking (PAT) beacons 102 for the laser 34 could use wavelengths less than one micrometer. All optical signals, whether communication or PAT beacon, are envisioned to share the same telescope optics. The interfaces to the optical modulator and detector portions of the overall terminal are designed to mimic a typical microwave transmitter. Therefore, microwave links can be upgraded transparently. The laser beam 34 is typically a semiconductor laser diode and chosen for wavelength considerations. The beam processing optics are a collection of filters, splitter/combiners, lenses and collimators that are used to deliver coherent beams to proper destinations as known to those skilled in the art.

The pointing and tracking sensor and signal processing circuit 104, such as the PAT sensor 73 of FIG. 1B, are used for the initial acquisition and, if necessary, reacquisition in tracking of various transmit and receive laser beams for communication with another satellite or spacecraft. The same sensor and processing algorithms can be used to continuously track the relative platform motions and provide beam steering commands to maintain the optical line-of-sight path. Special telescope pointing tracking beacon components 106 are used for optically establishing and maintaining optical alignment between two satellites or platforms. The non-mechanical steering device 52 of the present invention is used to mimic the usual mechanical devices found in some steering assemblies. The Bragg cell can also provide for beam spoiling where the beam divergence is intentionally increased to search the entire field of uncertainty (FOU) for a receiver located on another satellite. The usual approach is to perform a spiral scan of the field of uncertainty, which is time consuming and necessitates spacecraft attitude compensation.

The optical method of the present invention requires no altitude compensation, as this approach does not impulse the spacecraft as the pointing is adjusted, and the optical approach using the liquid crystal and Bragg cell decreases the payload weight, requires less fuel, and decreases acquisition times. It also provides higher bandwidth controls to maintain pointing, which reduces burst errors. Other circuits and components that are known to those skilled in the art are the optical communications detector circuit 78a, the frequency division multiplexer transmitter 10a, the receiver 70 having the frequency division demultiplexer, the telemetry I/F and power conditioning circuit 110, and the system controllers and processing circuits 112. An appropriate circuit bus 114 interconnects the various circuits.

The point-ahead angle for the laser beam can be calculated using a fast read-out focal plane CCD array and a two spot system. The point-ahead angle can be derived by computing the Euclidean distance between the centroids of a receive beacon and transmit signal. The data can be processed using a specialized read-out algorithm and dedicated digital signal processing hardware.

Figure 4:
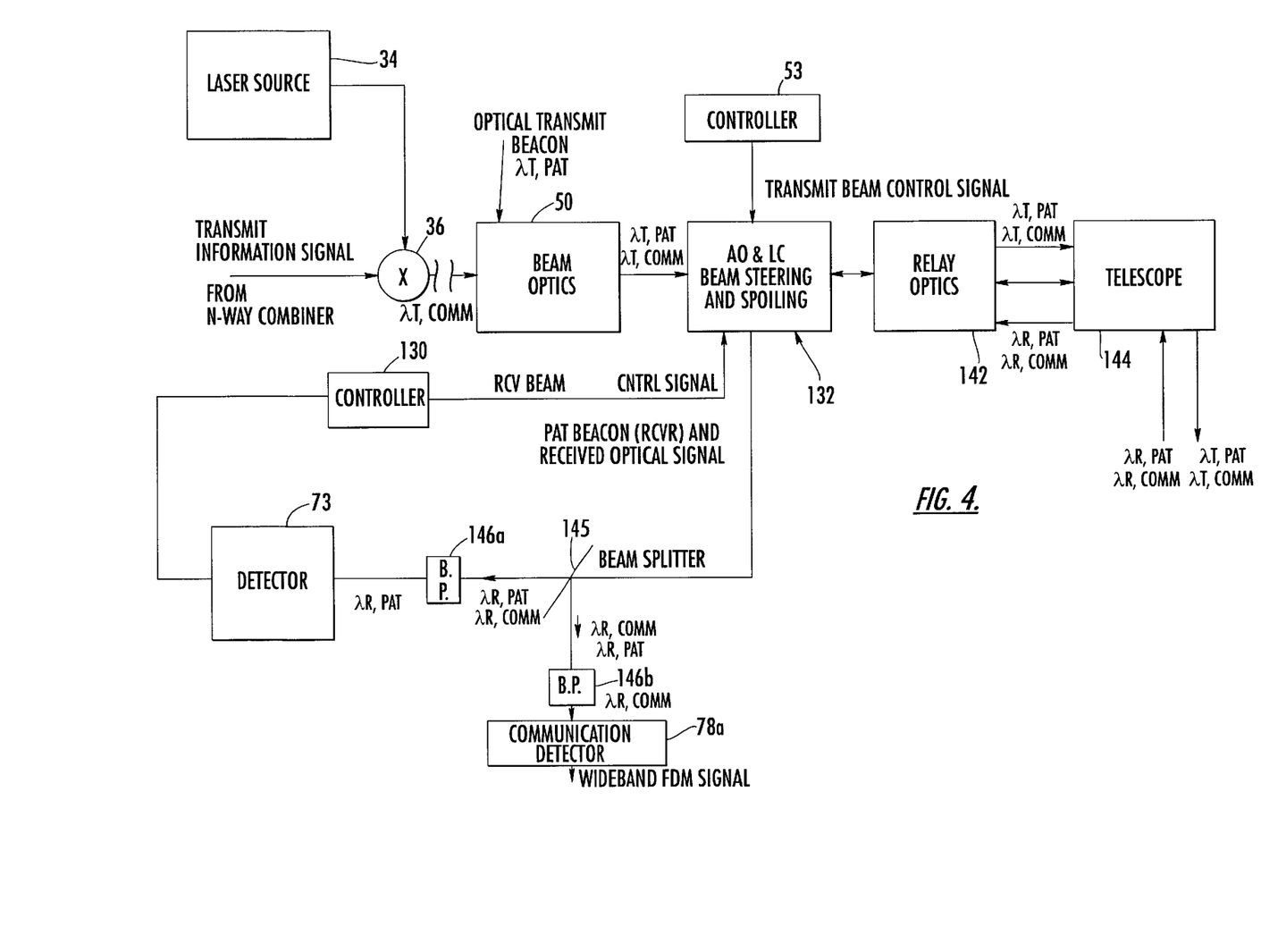
FIG. 4 is a schematic block diagram showing the overall system of the present invention using a beam steering device and controllers that generate transmit beam control signals and receive beam control signals for adjusting the index of refraction through the Bragg cell elements and liquid crystals.
Figure 5:
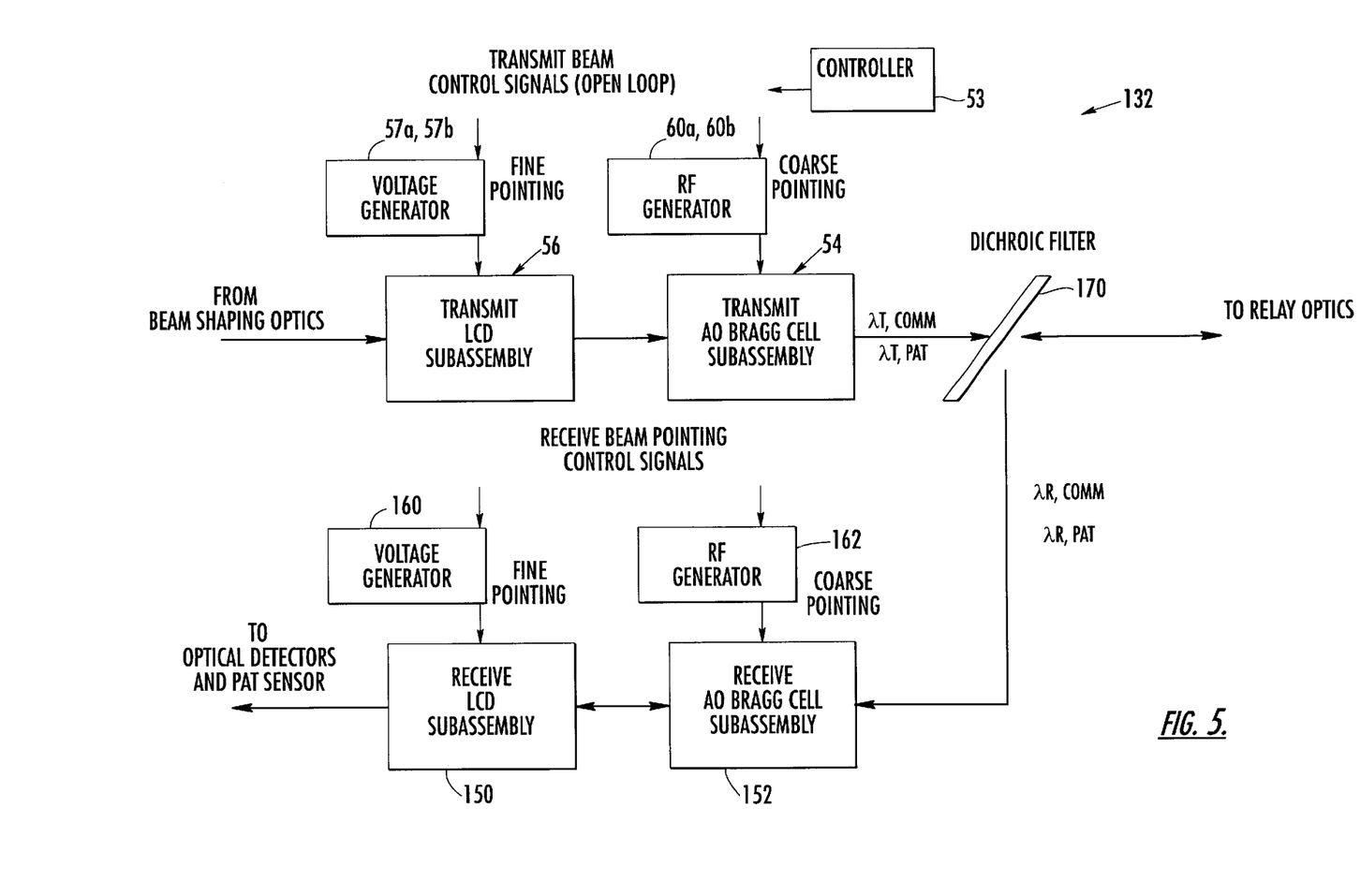
FIG. 5 is a schematic block diagram showing greater details of the beam steering and spoiling block of FIG. 4.
Figure 6:
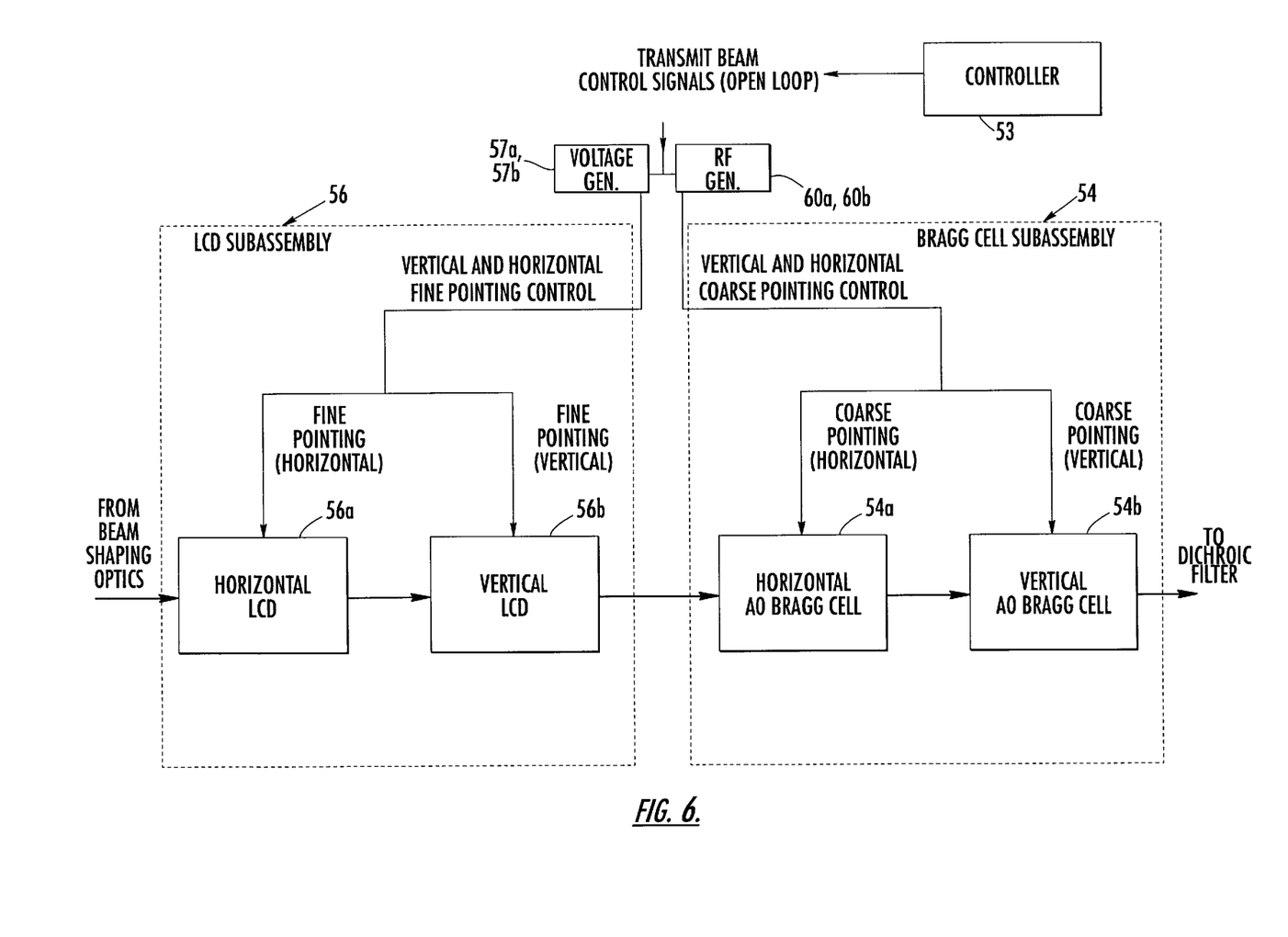
FIG. 6 is a block diagram of a transmit beam steering assembly showing horizontal and vertical liquid crystals and horizontal and vertical Bragg cell elements.
Figure 7:
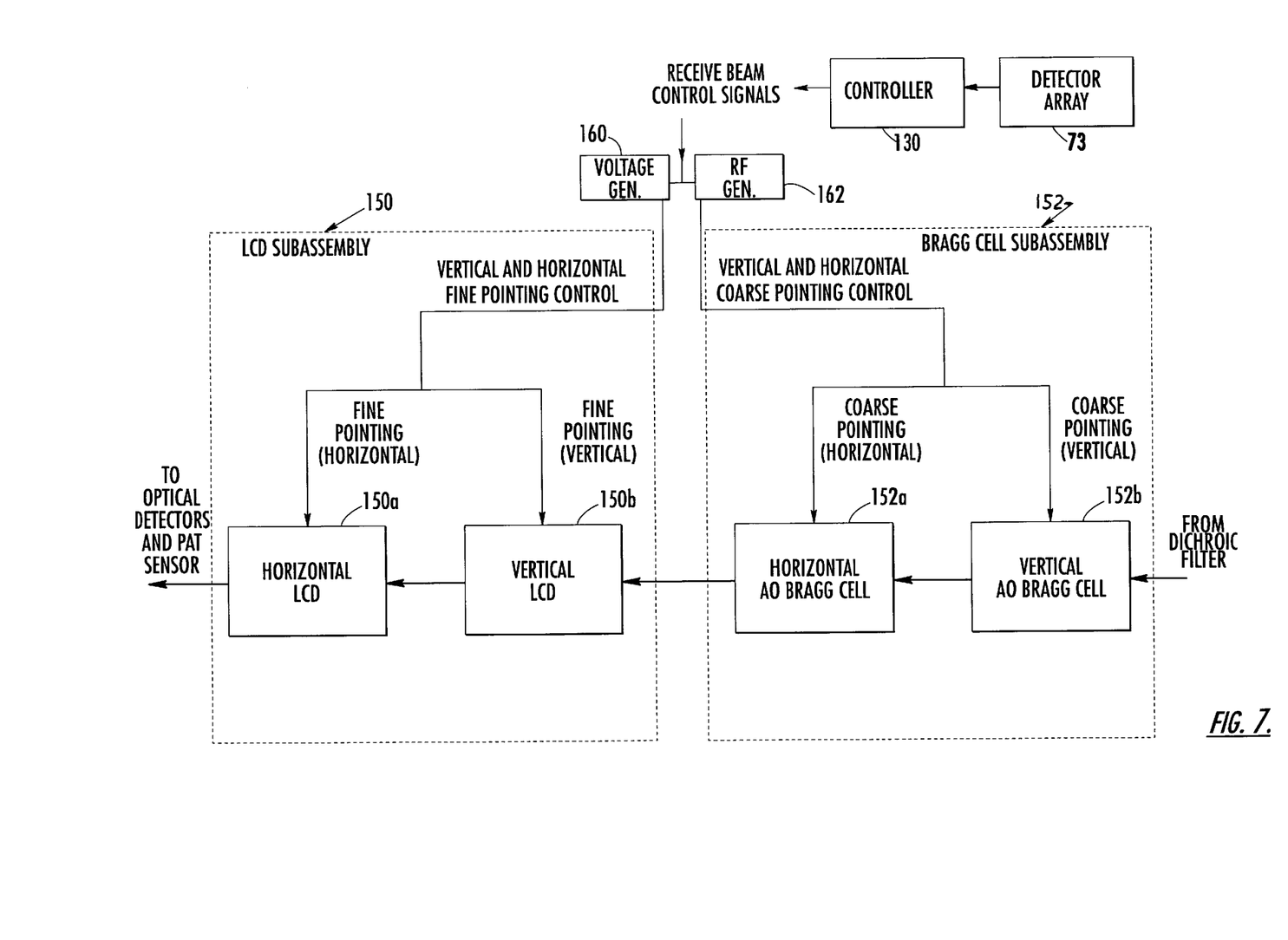
FIG. 7 is a block diagram of a receive beam steering assembly showing horizontal and vertical liquid crystals and horizontal and vertical Bragg cell elements.

FIGS. 4–7 illustrate in greater detail a basic high level block diagram (FIG. 4) and greater details in FIGS. 5–7 of the transmit beam steering assembly 52 and receive beam steering assembly 72. FIG. 4 illustrates a first communication terminal 14a having a controller 53 for generating a transmit beam control signal to provide beam steering control signals during transmit, and a controller 130 for generating a receive beam control signal to provide beam steering control signals during receive. In some embodiments, a single controller could be used to generate the transmit beam control signal and receive beam control signal to the transmit and receive beam steering assemblies, represented by the single beam steering and spoiling block shown at 132 and described in greater detail in FIG. 5. Other reference numerals that are common to the drawings and described in the disclosure above are set forth by the same numeric references.

Referring now to FIG. 4, there is illustrated an overall schematic block diagram of a system. As illustrated, one telescope 144 receives the pointing and tracking (PAT) beacon for both transmit and receive and the optical communications signal for both transmit and receive. The relay optics 142 could include other optics known to those skilled in the art. The AO and LC beam steering and spoiling components, indicated at block 132, are shown in greater detail in FIG. 5. As illustrated, a laser source 34 issues the carrier signal which, together with the transmit information signal from the N-way combiner, are modulated within the modulator 36 to produce the optical communications signal, which is received within the beam optics 50. The beam optics also receives the optical pointing and tracking (PAT) beacon. These signals are forwarded through the AO and LC beam steering and spoiling 132 and can be controlled by controller 53, which issues the transmit beam control signal. Transmitted signals pass through relay optics 142 and into telescope 144 into free space. Incoming optical communications signal $\lambda_{R,comm}$ and pointing and tracking beacons $\lambda_{R,PAT}$ pass into telescope 144, relay optics and beam steering and spoiling 132. These signals pass into a beam splitter 145. A band pass filter 146a filters out the communication signal, and detector 73 only receives the pointing and tracking beacon. The controller 130 is responsive to the detector 73 for controlling the beam steering. The other part of the signal from the beam splitter passes through the band pass filter 146b where the beacon is filtered. The signal passes to communications detector 78a to produce the wide band FDM signal.

It should be understood that two received beams are guided through optical paths, and split evenly in power in a beam splitter, and then filtered. The pointing and tracking detector, also referred to as the PAT sensor or detector 73, "sees" only the beacon wavelength. Conversely, the communication detector 78a only "sees" the data signal. It is possible to use the communication signal as the beacon. However, it is not preferred because of practical design limitations and theoretical impracticalities. It is preferred for practical reasons to offset a pointing and tracking beacon signal about 20 nanometers from the communication wavelength. We have presently used 830 nm as the preferred wavelength. It is also possible to use the same detector for acquisition and tracking. The various detectors used for detecting the signal, such as the pointing and tracking sensor or detector, can be a CCD array. However, a four-quadrant APD or CCD could also be used. In this structure, the signal, whether it is a communication or a separate beacon signal, is impinged on a detector, thus giving an error signal indicating a two-dimensional offset from a desired position. This signal is fed to the controller and then via control signal to beam steering electronics (the LC and Bragg cell) for "bending" or steering the received beam path (and possibly transmit beam if back to the same terminal). It is possible to use the same pointing and tracking (PAT) information to transmit and receive if two terminals are communicating as either full duplex or half-duplex.

Typically, the transmit side of the communication system, such as in a transmitter unit of a satellite, will "estimate" where the receiver unit is positioned initially before starting a transmission. This estimate will be based on the best emphemeris data that can be supplied to the spacecraft or satellite about its position and the target receiver unit. The transmitter unit will preferably then steer its beam into the commanded direction. The receiver unit will start scanning as it "looks" for the transmit beam or beacon. This is two-dimensional scanning space and the scan is done by controlling the beam steering device over the field of regard of the receiver. Also, beam spoiling techniques can be used to aid the acquisition process and reduce the acquisition time. It is not essential to reduce the acquisition time. Once the receiver acquires the transmit beacon, the receiver "knows" where the transmitter is and can communicate back to it. Both transmit and receive units can send beacons (possibly CW waves) to allow the two units to track the relative motions and continuously update the beam steering commands for both platforms.

Further details of the AO and LC beam steering spoiling are shown in FIG. 5. As shown in FIG. 5, the generated transmit beam control signals are part of an open loop system based upon information that various processors, typically in the communications terminal, determine as to the location of the first communications terminal and the anticipated location of the second communications terminal when the beam reaches it as described above. The transmit beam control signal can be generated by the controller 53 and can adjust the appropriate voltage generator 57a, 57b and RF generator 60a, 60b for fine and coarse pointing. Although two different voltage generators and RF transmitters could be used, one RF transmitter and one voltage generator could also be used by having one signal generated for horizontal indexing and one signal generated for vertical indexing.

It is evident that two different liquid crystal subassemblies and Bragg cell subassemblies are used at a communications terminal, such as the one illustrated at either 14a or 14b. The communications terminal 14a, 14b also includes the receive liquid crystal subassembly 150 and the receive Bragg cell subassembly 152. The receive liquid crystal subassembly 150 and receive Bragg cell subassembly 152 are part of the beam processing optics set forth in block 74 of FIG. 1B.

Referring to FIG. 7, the receive liquid crystal display subassembly 150 includes the first and second liquid crystal elements 150a, 150b for both horizontal and vertical indexing and the first and second Bragg cell elements 152a, 152b for vertical and horizontal indexing (FIG. 7). FIG. 6 illustrates the transmit side with first and second liquid crystal elements 56a, 56b for horizontal and vertical indexing and first and second Bragg cell elements 54a, 56b for horizontal and vertical indexing as shown in greater detail in FIG. 2.

FIG. 7 also illustrates one voltage generator 160 for receiving receive beam control signals from controller 130, and one RF generator 162 for receiving the receive beam control signal from the controller 130. As should be understood, separate voltage generators and RF generators could be used for changing the index of refraction through respective receive liquid crystal elements 150a, 150b and receive Bragg cell elements 152a, 152b.

A dichroic filter 170 is also included that allows only the desired optical frequencies to pass. The filter 170 also prevents unwanted optical frequencies from passing back into the communications terminal. It is also possible for one Bragg cell subassembly and one liquid crystal subassembly to be used for transmit and receive sides. The liquid crystal and Bragg cell units could also be reversed in configuration, as well as independently reversing the ordering of horizontal and vertical components.

It is evident that the present invention now allows non-mechanical steering using open loop control for a transmit and closed loop control for receive using a detector array. Naturally, it is possible to also use closed loop control on the transmit.

It is evident that the present invention is also advantageous because it now allows both data and analog communication signals to be transmitted on an optical carrier signal through phase modulation. The drawbacks of intensity modulation are also overcome by the present invention. The non-mechanical steering device of the present invention also is advantageous to allow greater bandwidths and faster tracking times.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of communicating in free space comprising the steps of:

generating a phase modulated optical communications signal;

generating a pointing and tracking beacon;

transmitting the phase modulated optical communications signal and pointing and tracking beacon from a first communications terminal to a receiver unit of a second communications terminal;

receiving the phase modulated optical communications signal and pointing and tracking beacon within a cascaded Bragg cell and liquid crystal at a second communications terminal; and changing the index of refraction based on the pointing and tracking beacon.

2. A method according to claim 1, and further comprising the step of passing the optical communications signal and pointing and tracking beacon through a Bragg cell and liquid crystal on the first communications terminal to provide for vertical and horizontal indexing in transmission.

3. A method according to claim 2, and further comprising the step of generating from a controller on the first communications terminal a transmit beam control signal that is indicative of the location of the first communications terminal and the anticipated location of the second communications terminal and changing the index of refraction of the Bragg cell and liquid crystal during transmit.

4. A method according to claim 1, and wherein the method further comprises the step of receiving the phase modulated optical communications signal and pointing and tracking beacon at the second communications terminal within a Bragg cell that comprises first and second Bragg cell elements for vertical and horizontal indexing.

5. A method according to claim 1, and further comprising the step of passing the phase modulated optical communications signal and pointing and tracking beacon through a dichroic filter that allows desired wavelengths to pass corresponding to the frequency range of the transmitted signal.

6. A method of communicating in free space comprising the steps of:

generating a phase modulated optical communications carrier signal;

generating a pointing and tracking beacon;

transmitting the phase modulated optical communications signal and pointing and tracking beacon from a first communications terminal to a receiver unit of a second communications terminal;

receiving the phase modulated optical communications signal within second communications terminal and passing the signal through a receive Bragg cell and liquid crystal of the second communications terminal;

detecting the pointing and tracking beacon;

generating a receive beam control signal to the receive Bragg cell and liquid crystal based on the detected pointing and tracking beacon to change the index of refraction through the receive Bragg cell and liquid crystal to compensate for receive errors;

demodulating the phase modulated optical communications signal back into the broad band frequency division multiplexed signal; and demultiplexing the frequency division multiplexed signal into a plurality of analog communication signals.

7. A method according to claim 6, and further comprising the step of passing the optical communications signal and pointing and tracking beacon through a cascaded Bragg cell and liquid crystal at the first communications terminal.

8. A method according to claim 7, and further comprising the step of generating from a controller on the first communications terminal a transmit beam control signal that is indicative of the location of the first communications terminal and the anticipated location of the second communications terminal when the phase modulated optical communication signal reaches the second communications terminal, and changing index of refraction through a Bragg cell and liquid crystal on the first communications terminal based on the transmit beam control signal.

9. A method according to claim 6, and further comprising the step of passing the phase modulated optical communication signal through a dichroic filter that allows desired wavelengths to pass corresponding to the frequency range of the transmitted signal.

10. A method according to claim 6, and further comprising the steps of:
   transmitting a phase modulated optical communications signal from the second communications terminal to the first communications terminal;
   receiving the phase modulated optical communications signal within a receive Bragg cell and liquid crystal of the first communications terminal;
   demodulating the phase modulated optical communications signal into a broad band frequency division multiplexed signal; and
   demultiplexing the frequency division multiplexed signal into a plurality of analog communication signals.

11. A system for communicating in free space comprising:
   a first communications terminal including:
   means for generating a phase modulated optical communications signal;
   means for generating a pointing and tracking beacon;
   a receiver positioned at a second communications terminal that receives the optical communications signal and pointing and tracking beacon and including:
      a cascaded Bragg cell and liquid crystal that receives the optical communications signal and pointing and tracking beacon;
      a pointing and tracking detector for detecting the pointing and tracking beacon; and
      a controller responsive to the pointing and tracking detector for issuing control signals to the cascaded Bragg cell and liquid crystal to change the index of refraction therethrough.

12. A system according to claim 11, wherein said Bragg cell comprises first and second Bragg cell elements to provide for respective vertical and horizontal indexing.

13. A system according to claim 11, wherein said liquid crystal comprises first and second liquid crystal display elements provide for respective vertical and horizontal indexing.

14. A system according to claim 11, and further comprising means for generating a radio frequency signal to the Bragg cell for changing the index of refraction and provide steering.

15. A system according to claim 11, and further comprising means for generating a voltage control signal to the liquid crystal display for changing the index of refraction through the liquid crystal display.

16. A system according to claim 11, and further comprising a dichroic filter positioned at the first communications terminal that allows desired wavelengths to pass corresponding to the frequency range of the transmitted signal.

17. A system for communicating in free space comprising:
   a first communications terminal including:
      a multiplexer circuit for multiplexing a plurality of analog communication signals into a single broad band frequency division multiplexed signal;
      a laser for generating an optical carrier signal;
      an electro-optic modulator that receives the broad band frequency division multiplexed signal and the laser generated optical carrier signal with the multiplexed signal to produce a phase modulated optical communications signal;
      means for generating a pointing and tracking beacon;
      a receiver positioned at a second communications terminal that receives the transmitted phase modulated optical communications signal and including:
         a cascaded Bragg cell and liquid crystal through which the optical communications signal and pointing and tracking beacon passes;
         a pointing and tracking detector for detecting the pointing and tracking beacon; and
         a controller responsive to the pointing and tracking detector for issuing control signals to the cascaded Bragg cell and liquid crystal to change the index of refraction therethrough.

18. A system according to claim 17, wherein said Bragg cell comprises first and second Bragg cell elements to provide for respective vertical and horizontal indexing.

19. A system according to claim 17, wherein said liquid crystal comprises first and second liquid crystal elements provide for respective vertical and horizontal indexing.

20. A system according to claim 17, and further comprising means for generating a radio frequency signal to the Bragg cell for changing the index of refraction and provide steering.

21. A system according to claim 17, and further comprising means for generating a voltage control signal to the liquid crystal for changing the index of refraction.

22. A system according to claim 17, and further comprising a dichroic filter positioned at the first communications terminal that allows desired wavelengths to pass corresponding to the frequency range of the transmitted signal.

23. A system according to claim 17, and wherein said electro-optic modulator further comprises a Mach-Zender electro-optic modulator.

24. A system according to claim 17, wherein said multiplexing circuit further comprises a respective mixer for up converting respective analog signals into a defined frequency channel, and a combiner for combining the up converted frequencies into the frequency division multiplexed signal.

25. A system according to claim 17, and further comprising a heterodyne detector at the second communications terminal for demodulating the phase modulated optical communications signal into the broad band frequency division multiplexed signal, and a demultiplexer for demultiplexing the broad band frequency division multiplexes signal into a plurality of analog communication signals.

26. A communications terminal comprising:
   a transmitter unit for transmitting a phase modulated optical communications signal and pointing and tracking beacon; and
   a receiver unit that receives a phase modulated optical communications signal and pointing and tracking beacon from another communications terminal, and comprising:
      a receive beam steering assembly that receives a phase modulated optical communications signal, and including:
         a cascaded Bragg cell and liquid crystal, wherein the index of refraction through the Bragg cell and receive liquid crystal is changed based on received pointing and tracking beacon.

27. A communications terminal according to claim 26, wherein said Bragg cell comprises first and second Bragg cell elements to provide for respective vertical and horizontal indexing.

28. A communications terminal according to claim 26, wherein said liquid crystal comprises first and second liquid crystal elements to provide for respective vertical and horizontal indexing.

29. A communications terminal according to claim 26, and further comprising a communications detector for detecting the optical communications signal and a pointing and tracking beacon detector for detecting the pointing and tracking beacon.

30. A communications terminal according to claim 26, and further comprising means for generating a radio frequency signal to the Bragg cell for changing the index of refraction and provide steering.

31. A communications terminal according to claim 26, and further comprising means for generating a voltage control signal to the liquid crystal for changing the index of refraction through the liquid crystal display.

32. A communications terminal according to claim 26, and further comprising a dichroic filter that allows desired wavelengths to pass corresponding to the frequency range of the transmitted signal.

33. A communications terminal according to claim 26, and further comprising a cascaded Bragg cell and liquid crystal at the transmitter unit through which the optical communications signal and pointing and tracking beacon passes.

34. A communications terminal comprising:
   a transmitter unit for transmitting a phase modulated optical communications signal, and comprising a multiplexer circuit for multiplexing a plurality of analog communication signals into a single broad band frequency division multiplexed signal;
   a laser for generating an optical carrier signal;
   an electro-optic modulator that receives the broad band frequency division multiplexed signal and the laser generated optical carrier signal with the multiplexed signal to produce a phase modulated optical communications signal;
   means for generating a pointing and tracking beacon;
   a transmit beam steering assembly for non-mechanically steering the optical communications signal; and
   a receiver unit that receives a phase modulated optical communications signal and pointing and tracking beacon from another communications terminal, and comprising:
      a cascaded Bragg cell and liquid crystal, wherein the index of refraction through the Bragg cell and liquid crystal is changed based on the received pointing and tracking beacon;
      a demodulator for demodulating the phase modulated optical communications signal back into the broad band frequency division multiplexed signal; and
      a demultiplexer for demultiplexing the broad band frequency division multiplexed signal into the plurality of analog communication signals.

35. A communications terminal according to claim 26, wherein said Bragg cell comprises first and second Bragg cell elements to provide for respective vertical and horizontal indexing.

36. A communications terminal according to claim 34, wherein said liquid crystal comprises first and second liquid crystal elements to provide for respective vertical and horizontal indexing.

37. A communications terminal according to claim 34, and further comprising a communications detector for detecting the optical communications signal and a pointing and tracking beacon detector for detecting the pointing and tracking beacon.

38. A communications terminal according to claim 34, and further comprising means for generating a radio frequency signal to the Bragg cell for changing the index of refraction to provide steering.

39. A communications terminal according to claim 34, and further comprising means for generating a voltage control signal to the liquid crystal for changing the index of refraction through the liquid crystal.

40. A communications terminal according to claim 34, and further comprising a dichroic filter that allows desired wavelengths to pass corresponding to the frequency range of the transmitted signal.

41. A communications terminal according to claim 34, and wherein said electro-optic modulator further comprises a Mach-Zender electro-optic modulator.

42. A communications terminal according to claim 34, wherein said multiplexing circuit further comprises a respective mixer for up converting respective analog signals into a defined frequency channel, and a combiner for combining the up converted frequencies into the frequency division multiplexed signal.

43. A communications terminal according to claim 34, wherein said demodulator comprises a heterodyne detector for demodulating the phase modulated optical communications signal.

44. A beam steering device for free space optical communications comprising:
   a Bragg cell having first and second Bragg cell elements for providing vertical and horizontal indexing of a phase modulated optical communication signal; and
   a liquid crystal cascaded with the Bragg cell and having first and second liquid crystal elements to provide vertical and horizontal indexing of a phase modulated optical communication signal;
   a pointing and tracking beacon detector for detecting a pointing and tracking beacon received with an optical communications signal; and
   a controller responsive to the pointing and tracking beacon detector for generating control signals to the Bragg cell and liquid crystal for changing the index of refraction therethrough.

45. A beam steering device according to claim 44, and further comprising a controller for generating a control signal, and a radio frequency generator that receives the control signal and generates a radio frequency control signal to the Bragg cell in response thereto.

46. A beam steering device according to claim 44, and further comprising a controller for generating a control signal, and a voltage generator that receives the control signal and generates a voltage control signal to the liquid crystal display in response thereto.

* * * * *